United States Patent
Baboval

(10) Patent No.: US 10,127,062 B2
(45) Date of Patent: Nov. 13, 2018

(54) DISPLAYING GRAPHICS FOR LOCAL VIRTUAL MACHINE BY ALLOCATING TEXTUAL BUFFER

(71) Applicant: Citrix Systems, Inc., Fort Lauderdale, FL (US)

(72) Inventor: John Baboval, Littleton, MA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 506 days.

(21) Appl. No.: 14/060,519

(22) Filed: Oct. 22, 2013

(65) Prior Publication Data
US 2015/0113526 A1    Apr. 23, 2015

(51) Int. Cl.
G06F 9/455    (2018.01)
G06F 9/451    (2018.01)

(52) U.S. Cl.
CPC .......... G06F 9/45533 (2013.01); *G06F 9/451* (2018.02)

(58) Field of Classification Search
CPC .............................. G06F 9/45533; G06F 9/451
See application file for complete search history.

(56) References Cited

U.S. PATENT DOCUMENTS

| | | | | |
|---|---|---|---|---|
| 7,950,026 B1 * | 5/2011 | Urbach | .................... | G09G 5/14 715/733 |
| 2005/0210158 A1 * | 9/2005 | Cowperthwaite | ... | G06F 9/45558 710/1 |
| 2007/0198656 A1 | 8/2007 | Mazzaferri et al. | | |
| 2007/0236432 A1 * | 10/2007 | Benjamin | ............ | G09G 3/3648 345/87 |
| 2010/0253693 A1 * | 10/2010 | Streatch | ................ | G06F 9/4443 345/548 |
| 2010/0306771 A1 | 12/2010 | Kamay et al. | | |
| 2011/0126198 A1 | 5/2011 | Vilke et al. | | |
| 2012/0096368 A1 | 4/2012 | McDowell | | |
| 2012/0179874 A1 | 7/2012 | Chang et al. | | |

(Continued)

FOREIGN PATENT DOCUMENTS

KR    10-2012-0072904    7/2012

OTHER PUBLICATIONS

GViM: GPU-accelerated Virtual Machines, Gupta et al., Mar. 31, 2009.*

(Continued)

*Primary Examiner* — Benjamin C Wu
(74) *Attorney, Agent, or Firm* — Allen, Dyer, Doppelt + Gilchrist, PA

(57) ABSTRACT

A computing device is provided for displaying images that are two dimensional (2D) or three dimensional (3D). The computing device includes one or more processors configured to obtain graphical data that has been generated by one or more applications associated with a first virtual machine and map one or more virtual apertures or one or more actual buffers associated with the first virtual machine to a textual buffer associated with a second virtual machine. The virtual apertures are in a virtual memory space and the actual buffers are in a physical memory space. The one or more processors are also configured to process the graphical data based on the mapping. The computing device also includes a display device configured to display the 2D or 3D images using the processed graphical data.

19 Claims, 10 Drawing Sheets

(56) References Cited

U.S. PATENT DOCUMENTS

2014/0281055 A1* 9/2014 Davda ................ G06F 12/1081
710/26

OTHER PUBLICATIONS

OpenGL Tutorial 14: Render to Texture , May 27, 2011.*
Veysel Demir and Atef Z. Elsherbeni, CUDA-OpenGL Interoperability to Visualize Electromagnetic Fields Calculated by FDTD, Applied Computational Electromagnetics Society Journal. Feb. 2012, vol. 27 Issue 2, p. 206-214. 9p.*
International Search Report and Written Opinion dated Jul. 10, 2014 for International Appl. No. PCT/US2013/066223.
Source Code located at: ://github.com/dvdhrm/docs/blob/master/drm-howto/modeset.c (10 pgs.) (last visited Nov. 15, 2013).
Official Communication for European Patent Application No. 13895834.3 dated Jun. 21, 2017.

* cited by examiner

DISPLAYING GRAPHICS FOR LOCAL VIRTUAL MACHINE BY ALLOCATING TEXTUAL BUFFER

FIELD

The present disclosure generally relates to virtualization technologies. Exemplary embodiments relate to methods and systems for displaying two-dimensional (2D) or three-dimensional (3D) graphics using graphical data provided by a virtual machine.

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine. A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine. In some embodiments, a dom0 virtual machine can have direct access to host computer's hardware resources and thus the control program can be executed by the host computer's operating system. In some embodiments, a dom0 virtual machine can have access to the host computer's hardware resources through a hypervisor that either runs directly on the host computer's hardware (i.e., a bare metal hypervisor) or runs within the host computer's operating system (i.e., a hosted hypervisor).

Virtual machines are often used to run graphical applications, such as applications for rendering and displaying 3-D graphical objects on the display device of the host computer. For displaying the 3-D graphical objects on the host computer, the current virtual machine technology often requires frequent copying of large amount of graphical data from the physical memory allocated for a domU virtual machine, on which the requesting application is running, to the physical memory allocated for a dom0 virtual machine that have access to the host computer's hardware resources, including Graphics Processing Units (GPUs), a graphic memory, and a display device. Frequent copying of large amount of graphical data, however, can cause significant degradation of the overall system performance, increased power consumption, and therefore overall reduction of efficiencies of utilizing the virtual machines.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide virtual and physical memory space mapping techniques for graphical data processing in a virtualization environment. The mapping techniques described herein can enable processing of graphical data such that frequent copying of graphical data can be avoided, and thus can improve the overall efficiencies of displaying graphics in a virtualized environment.

Figure 1:
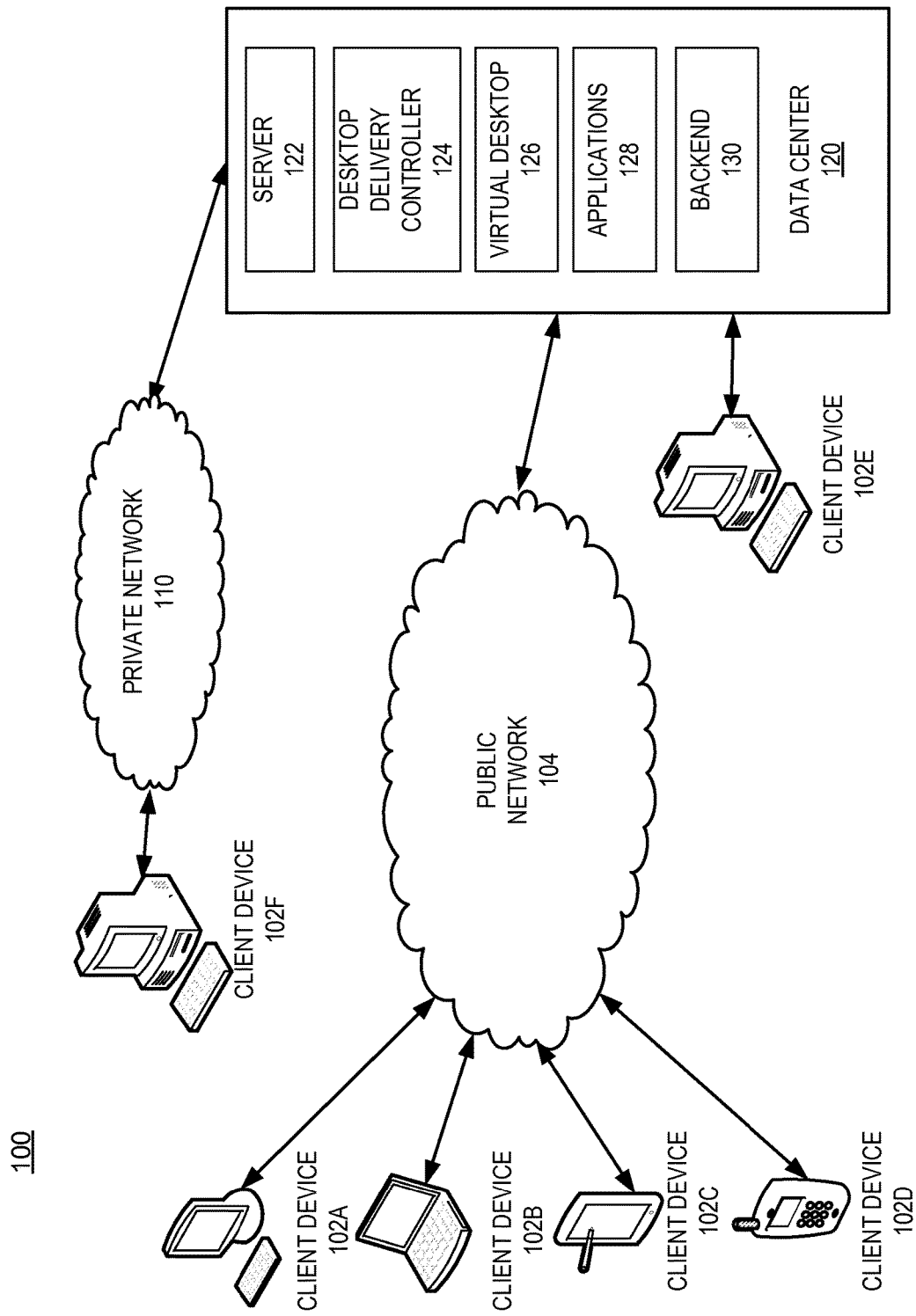
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, and a data center 120.

One or more client devices 102A-F are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing a client device (e.g. client device 102F) access to data center 120. While client devices 102A-F are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services can include providing one or more applications 128 to one or more endpoints (e.g., client devices 102A-F). For example, the one or more applications 128 can include Windows™- or SAP™-based applications and computing resources.

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple user to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Figure 2A:
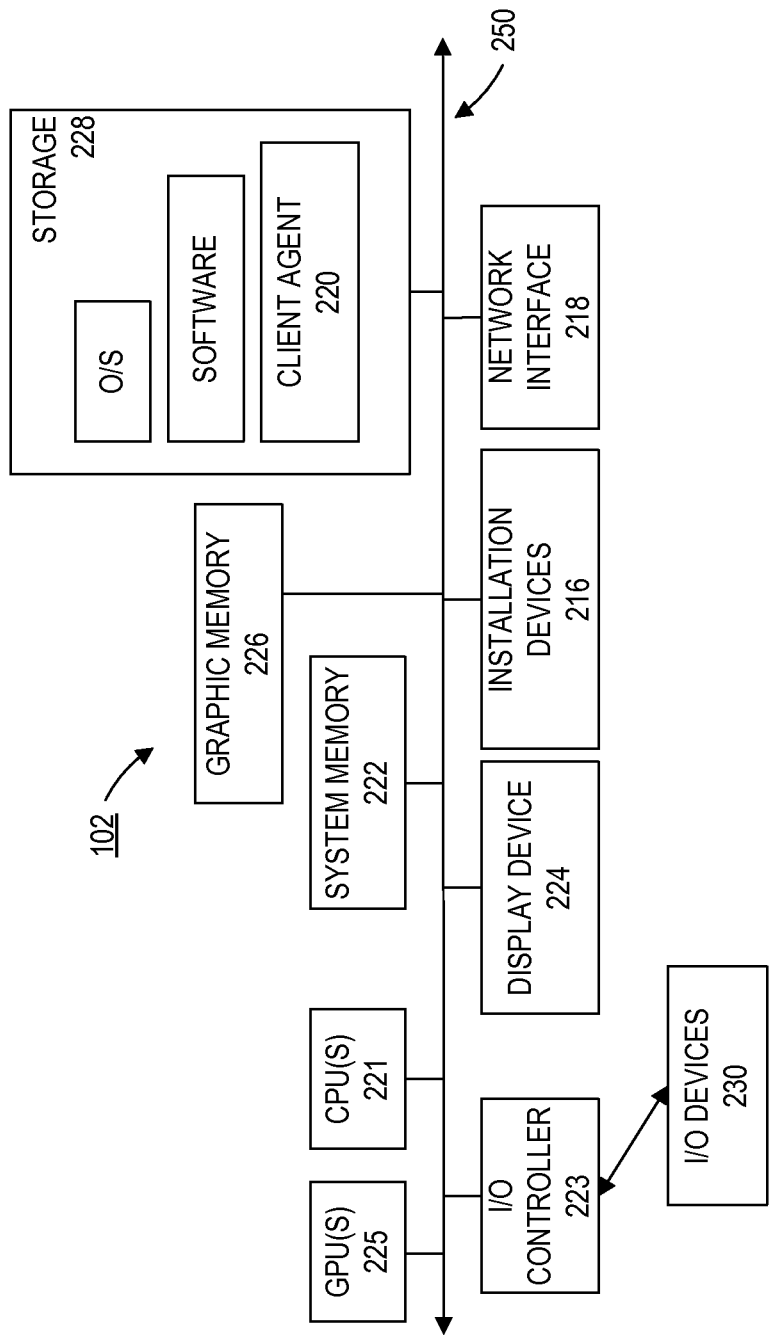
FIGS. 2A-2B are block diagrams of an exemplary computing device, consistent with embodiments of the present disclosure.
Figure 2B:
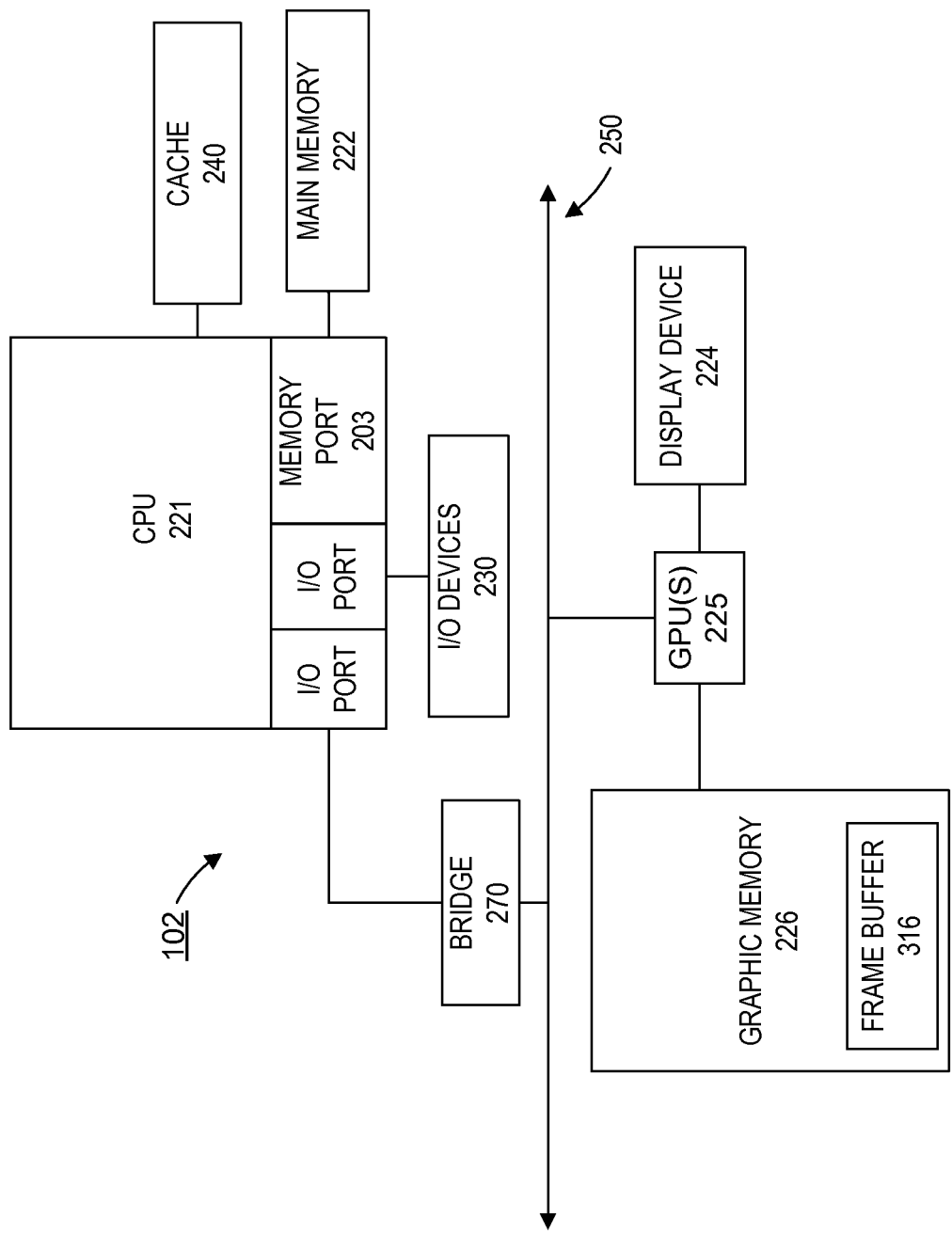

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 3) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, may be integrated into a single processing unit. GPUs 225 can be capable of executing particular sets of instructions stored in system memory 222 to manipulate graphical data store in system memory 225 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of 2D or 3D graphics images corresponding to graphical data stored in graphic memory 226 on display device 224.

Client device 102 can also include display device 224 and an input/output (I/O) device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some other embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 can store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
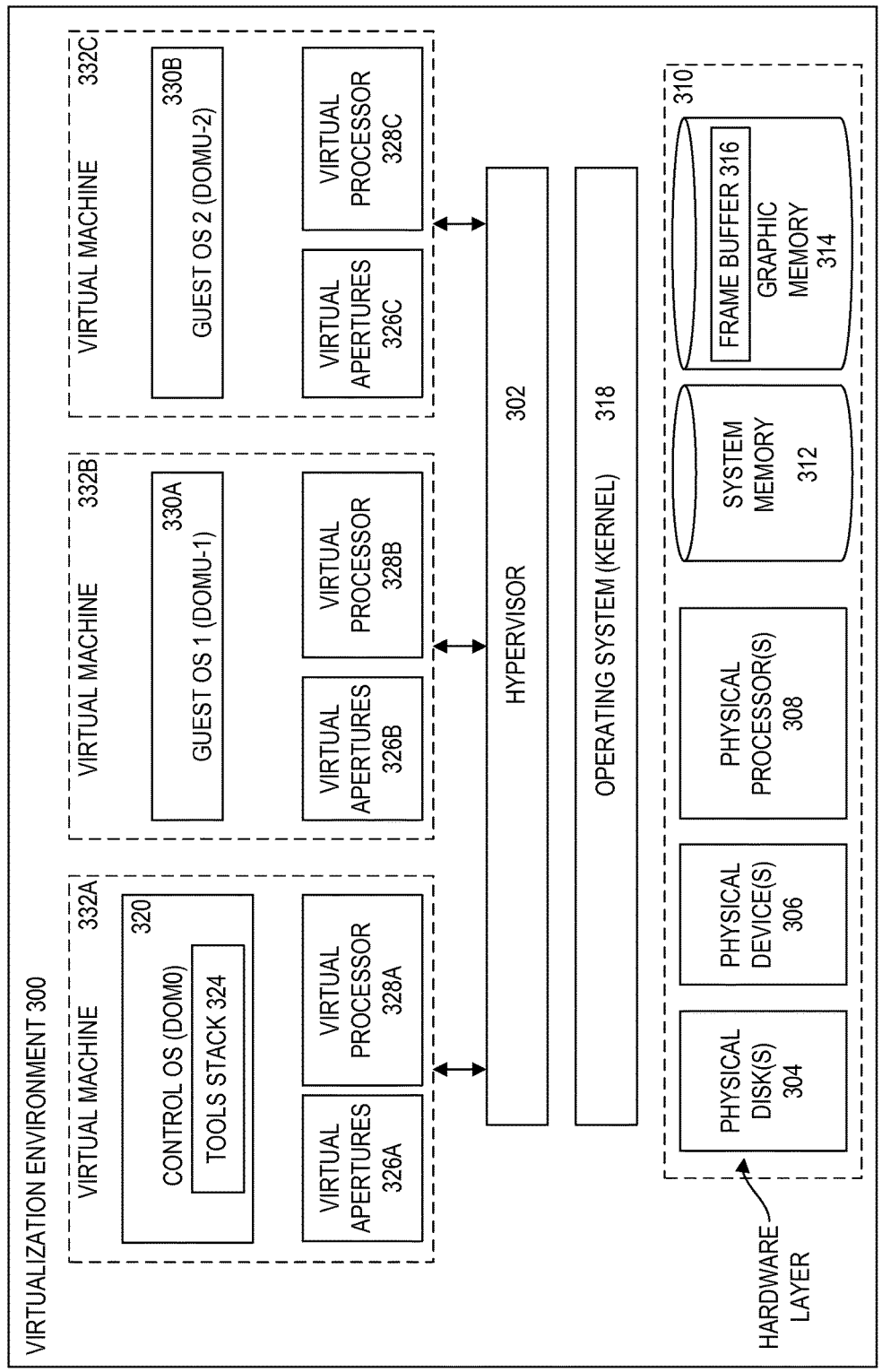
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include a computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304, one or more physical devices 306, one or more physical processors 308, a system memory 312, and a graphic memory 314. In some embodiments, frame buffer 316 can be stored within a memory element in graphic memory 314 and can be executed by one or more of physical processors 308.

Physical disk 304 can be either an internal or an external hard disk. Virtualization environment 300, in some embodiments, can communicate with an external hard disk that is included in the hardware layer 310 as a physical disk 304. Physical devices 306, in some embodiments, can be any combination of devices included in virtualization environment 300 and external devices that communicate with virtualization environment 300. Physical device 306 can be any device such as a network interface card, a video card, a keyboard, a mouse, an input device, a monitor, a display device, speakers, an optical drive, a storage device, a universal serial bus connection, any device connected to virtualization environment 300, any device communicating with virtualization environment 300, a printer, a scanner, or any other device that is desired. In some embodiments, physical processors 308 can be any processor and can include, for example, CPUs and GPUs.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics images corresponding to graphical data stored in graphic memory 316 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing machine. Hypervisor 302 can be stored in a memory element in system memory 312.

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machine 332A-C executing in virtualization environment 300.

In some embodiments, hypervisor 302 can create virtual machines 332A-C, in which guest operating systems 330A-B or control operating system 320 execute. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, in some embodiments, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g. virtual machine 332A). This dom0 virtual machine can imitate the host operating system by allowing a user to interact with the computing device in substantially the same manner that the user would interact with the computing device via host operating system 318.

In some embodiments, virtualization environment 300 can host or execute one or more virtual machines 332A-C. As described above, a virtual machine executing a control operating system can be called dom0 virtual machine, and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more virtual apertures 326A-C (collectively as 326) in a virtual memory space. A virtual memory space can be a virtual view of the virtual memory available to virtual machines 332. Virtual apertures 326 can correspond to for example, caches, buffers, physical memories such as system memory 312, and graphic memory 314, internal or external physical disks such as hard disk 304. As an example, under the circumstances that applications running on virtual machine 332A do not require memory more than that is available in graphic memory 314, virtual apertures 326A of virtual machine 332A can correspond to a portion of graphic memory 314. As another example, under the circumstances that applications running on virtual machine 332B requires memory more than that is available in graphic memory 314, virtual apertures 326B of virtual machine 332B can correspond to one or more portions of graphic memory 314, system memory 312, or even one or more portions of physical disks 304. Virtual apertures 326 can be generated, provided, and managed by hypervisor 302. Details of virtual apertures 326 and its relation to the physical memory are described below.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308.

In FIG. 3, control operating system 320 can execute at least one application for managing and configuring the guest operating systems (domUs 330, e.g. domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute an administrative application or program that can further display a user interface, which administrators can use to access the functionality of each virtual machine 332 and/or to manage each virtual machine 332. In some embodiments, the user interface generated by the administrative program can be used to terminate the execution of virtual machines 332, allocate resources to virtual machines 332, assign permissions to virtual machines 332, or manage security credentials associated with virtual machines 332.

Moreover, in some embodiments, control operating system 320 can start new virtual machines 332 or terminate execution of executing virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, in some embodiments, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, in some embodiments, guest operating systems 330 can provide users of virtualization environment 300 with access to resources within a computing environment. Such resources can include programs, applications, files, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4:
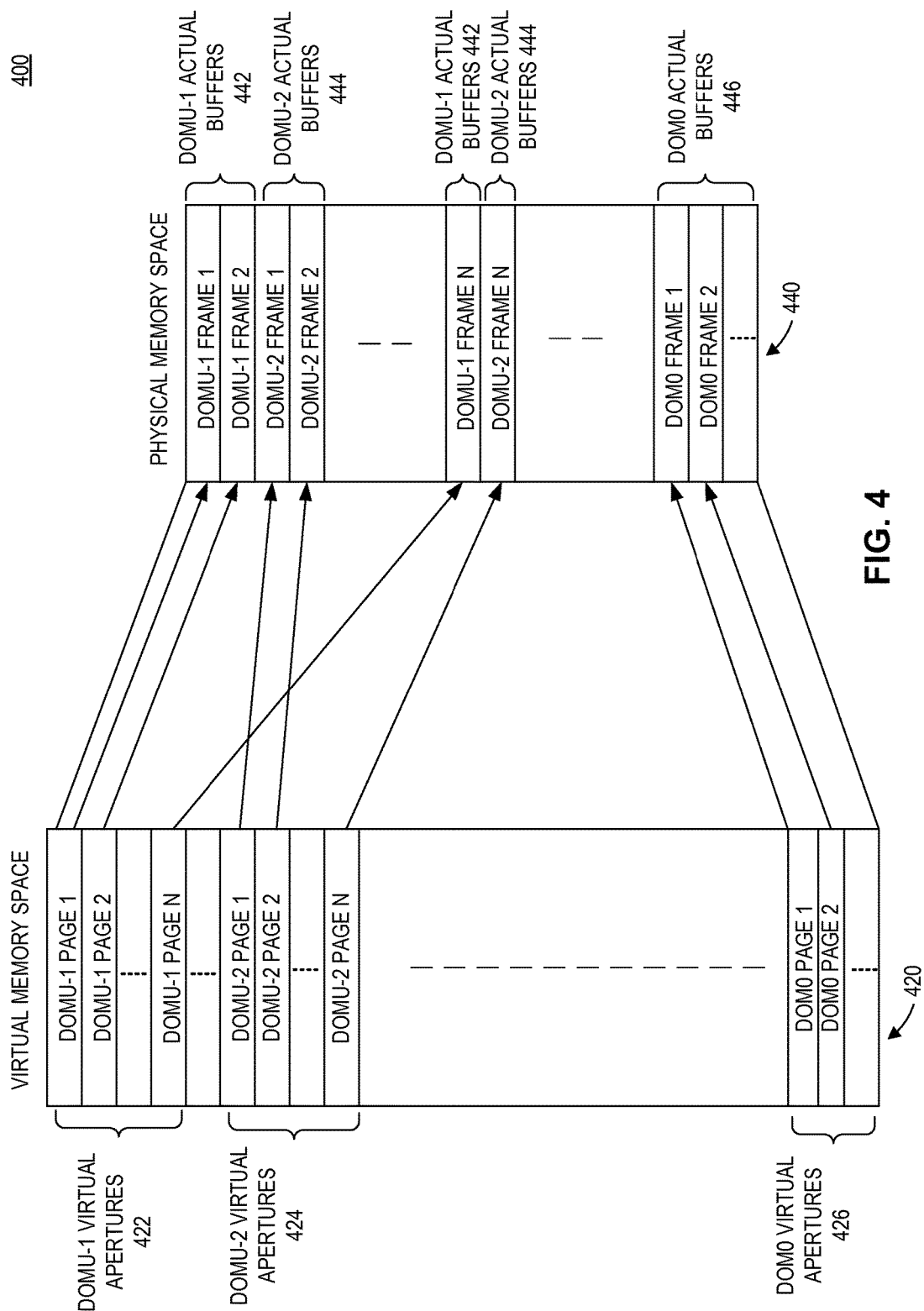
FIG. 4 is a block diagram of an exemplary page table illustrating mapping of virtual apertures in a virtual memory space and actual buffers in a physical memory space, consistent with embodiments of the present disclosure.

FIG. 4 is a block diagram of an exemplary page table 400 illustrating mapping between a virtual memory space 420 and a physical memory space 440. A page table can be a data structure used by a virtual memory system in a computer operating system to store the mapping between memory addresses associated with a virtual memory space (e.g., virtual memory space 420) and memory addresses associated with a physical memory space (e.g., physical memory space 440).

In a virtualization environment that includes a virtual memory space, applications executed by a virtual machine can be allocated with contiguous memory addresses in a virtual memory space. As an example, as shown in FIG. 4, virtual memory space 420 can include a plurality of virtual apertures corresponding to processes and applications executed by operating systems such as domU-1, domU-2, and dom0 operating systems. Virtual apertures can be any portion of a virtual memory space. The plurality of virtual apertures in virtual memory space 420 can include, for example, domU-1 virtual apertures 422, domU-2 virtual apertures 424, and dom0 virtual apertures 426. In virtual memory space 420, virtual apertures 422, 424, and 426 can have contiguous memory addresses, or pages. For example, domU-1 virtual buffer 422 can include contiguous memory addresses from domU-1 page 1 through domU-1 page n. As a result, processes and applications executed by the domU-1 operating system (e.g., domU-1 operating system 330A) can interface with a contiguous section of memory addresses in the virtual memory space. Such contiguous section of memory addresses can be referred to as domU-1 virtual apertures 422.

The virtual apertures in virtual memory space 420 can be mapped to actual buffers in physical memory space 440 through page table 400. For example, domU-1 page 1 through domU-1 page n of domU-1 virtual apertures 422 can be mapped to domU-1 frame 1 through domU-1 frame n of domU-1 actual buffers 442 in physical memory space 440. Similarly, domU-2 virtual apertures 424 and dom0 virtual apertures 426 can also be mapped to their corresponding actual buffers, i.e., domU-2 actual buffers 444 and dom0 actual buffers 446. The memory addresses of actual buffers in physical memory space 440 can be contiguous or non-contiguous. For example, domU-1 actual buffers 442 can include domU-1 frame 1 and domU-1 frame 2 in a contiguous section of physical memory space 440; and can also include domU-1 frame n in another section that is not contiguous to domU-1 frame 1 and domU-1 frame 2. It is appreciated that memory addresses of frames in physical memory space 440 can be in any order or in any section, either contiguous or non-contiguous. Therefore, processes and applications executed by a particular operating system, such as domU-1 operating system 330A, can use different sections of physical memory space 440.

Moreover, physical memory space 440 can include any type of hardware including a cache, a system memory, a graphic memory, a flash, and a hard disk. Thus, a process or application, such as a graphic application for rending textures, not only can use its allocated graphic memory, but also can use virtual graphic memories (e.g., paged-out system memories or paged-out hard disks). A process or application running on a virtual machine can request access to its memory by providing the memory addresses associated with the pages of the virtual apertures to its operating system (e.g., domU-1 operating system 330A). After receiving the virtual addresses provided by the process or application, the operating system can obtain the mapping between the addresses of virtual apertures and the corresponding addresses associated with actual buffers in the physical memory space. For example, using page table 400, domU-1 operating system 330A can obtain mapping between addresses of domU-1 virtual apertures 422 and addresses of domU-1 actual buffers 442.

Furthermore, in some embodiments, a processor (e.g., virtual processors 328 or physical processors 308) can store, in a cache, recently used mappings obtained from the page table. Such cache is sometimes also referred to as a translation lookaside buffer (TLB). When addresses of virtual apertures need to be mapped to addresses of actual buffers, the TLB can be searched first to see whether a matching (a TLB hit) can be found. If a matching is found, the addresses of actual buffers can be provided and the memory access can be executed. If a matching is not found, the operating system can further search the mapping in the page table (e.g., page table 400) to see whether a matching exists (i.e., a page walk).

Figure 5A:
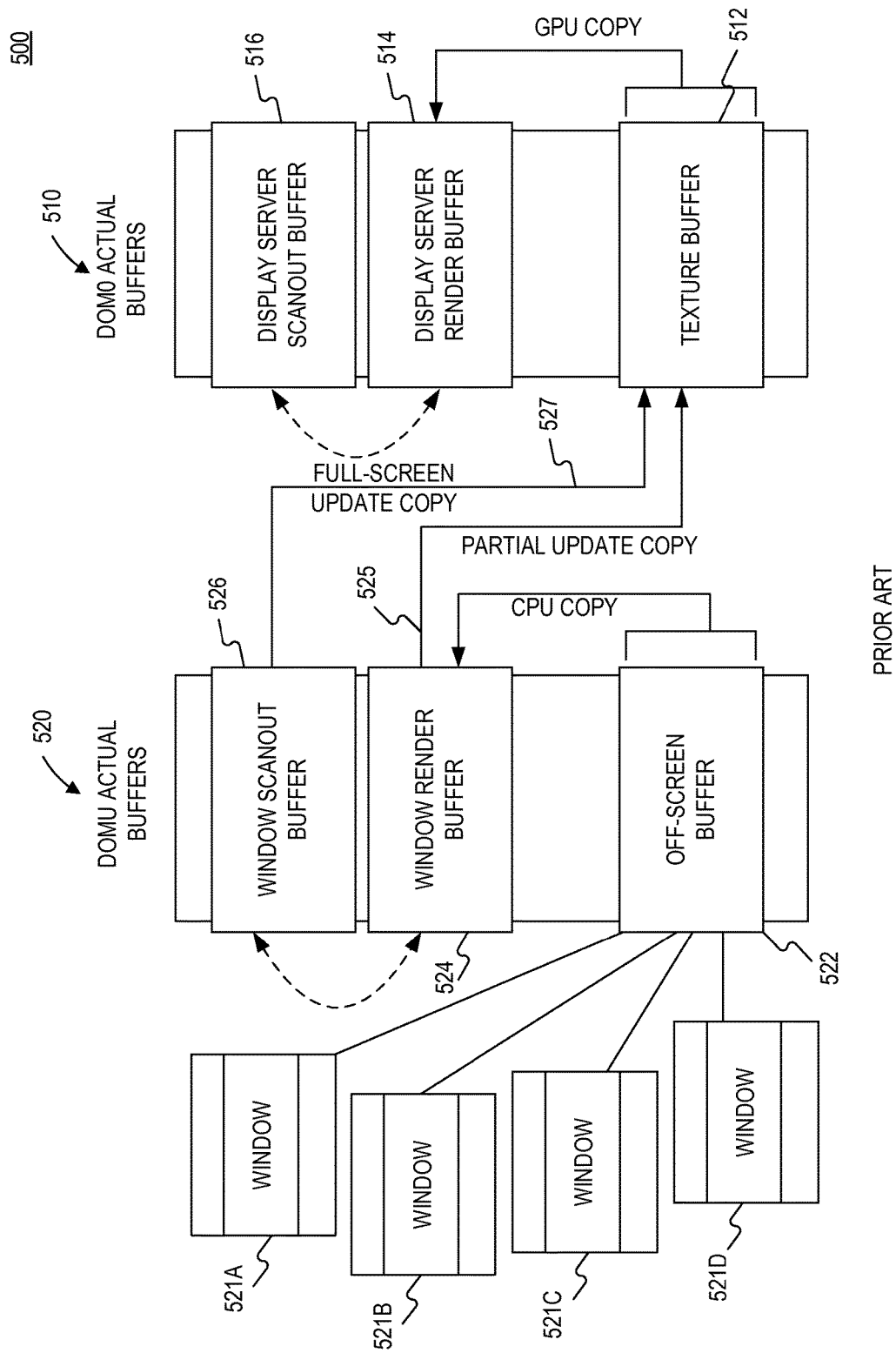
FIG. 5A is a block diagram of a prior art model for providing graphical data generated by a virtual machine for displaying.

FIG. 5A is a block diagram of a prior art model 500 for providing graphical data generated by a virtual machine for displaying. As shown in FIG. 5A, in model 500, a plurality of windows 521A-D are provided by corresponding applications executed by a domU operating system (e.g., domU-1 operating system 330A) of a domU virtual machine (e.g., domU-1 virtual machine 332B). The domU virtual machine is allocated with domU actual buffers 520. DomU actual buffers 520 includes a plurality of actual buffers in a physical memory space (e.g., physical memory space 440). Windows 521A-D are, for example, displays of desktops or applications such as web applications, video applications, 2D or 3D graphic applications, etc. DomU actual buffers 520 are physical memories allocated for the domU virtual machine. During the execution of applications associated with windows 521A-D, the corresponding domU operating system provides those applications access to domU actual buffers 520 by using, for example, virtual apertures and a page table containing mapping of the virtual apertures to domU actual buffers 520. DomU actual buffers 520 includes an off-screen buffer 522, a window render buffer 524, and a scanout buffer 526.

As shown in FIG. 5A, new or updated graphical data of windows 521A-D is transmitted or sent to off-screen buffer 522. The graphical data of windows 521A-D is generated by, for example, applications executed by the domU operating system of the domU virtual machine. The graphical data is 2D data and/or 3D data. For example, the graphical data of windows 521A-D corresponds to 3D desktop objects in the domU operating system, such as a Window 7 operating system.

After off-screen buffer 522 receives graphical data from windows 521A-D, the graphical data is copied from off-screen buffer 522 to window render buffer 525 for further rending a composite window, such as a full-screen desktop. As described above, the graphical data of windows 521A-D corresponds to 3D desktop objects in the domU operating system, such as a Window 7 operating system. Thus, the graphical data stored in off-screen buffer 522 represents 3D desktop objects (i.e., windows 521A-D) hosted by a desktop. For rendering the desktop hosting the 3D desktop objects, a graphic driver program, such as a Windows Display Driver Model (WDDM) driver program, instructs a processor (e.g., virtual processor 328B or CPU 221) to copy the graphical data stored in off-screen buffer 522 to window render buffer 524. In window render buffer 524, the graphic driver program renders composite graphical data representing the desktop and one or more windows (e.g., windows 521A-D) hosted by the desktop. The composite graphical data is represented by textured meshes used for rendering 2D or 3D images, such as images of a full-screen desktop.

Moreover, the graphic driver program also instructs the processor to render and/or update the composite graphical data in window render buffer 524 corresponding to a partial update or a full-screen update. As an example, off-screen buffer 522 can receive updates from window 521A, but not from other windows 521B-D. As a result, the graphical data stored in off-screen buffer 522 is partially updated with the new data received from window 521A. The graphic driver program thus instructs the processor to make a copy of the partially updated graphical data from off-screen buffer 522 to window render buffer 524. Correspondingly, composite graphical date in window render buffer 524 is partially updated as well. After the composite graphical data is partially updated, the graphic driver program instructs the processor to copy the partially updated composite graphical data (e.g., partial update copy 525) to dom0 actual buffers 510 for rendering and displaying 2D or 3D images, such as images of a partially updated full-screen desktop. As an example, the graphic driver program sends a "RECT" command for performing a partial update and sends a "FENCE" command to wait for the partial update to be completed. Once the copy of the partially updated composite graphical data is complete, a display server program responds to the "FENCE" command to indicate that the copy is complete. The display server program is described in detail below.

As another example, the graphical data stored in off-screen buffer 522 can be substantially or fully updated with the new graphical data received from all windows 521A-D. The graphic driver program then instructs the processor to copy the substantial updates from off-screen buffer 522 to window render buffer 524. Under this circumstance, the graphic driver program instructs the processor to simply re-render new composite graphical data in window render buffer 524 using the updates copied from off-screen buffer 522. After the rendering is complete, the graphic driver program instructs the processor to copy the newly rendered composite graphical data from window render buffer 524 to window scanout buffer 526. The new composite graphical data (e.g., full-screen update copy 527) is then copied from window scanout buffer 526 to dom0 actual buffers 510 for rendering and displaying 2D or 3D images, such as images of a full-screen desktop. As an example, the graphic driver program sends a "RECT" command for performing a full update and sends a "FENCE" command to wait for the full update to be completed. Once the copy of the fully updated composite graphical data is complete, a display server program responds to the "FENCE" command to indicate that the copy is complete.

Moreover, using window scanout buffer 526, while the newly rendered composite graphical data is being copied from window scanout buffer 526 to dom0 actual buffers 510, the graphic driver program instructs CPU to process the next update or re-rendering of composite graphical data in window render buffer 524. Window scanout buffer 526 and window render buffer 524 can be functionally exchanged so as to avoid copying the rendered composite graphical data from window render buffer 524 to window scanout buffer 526. As an example, after a rendering of composite graphical data is complete, the graphic driver program instructs the processor to exchange the two pointers associated with window render buffer 524 and window scanout buffer 526, so that the rendered composite graphical data is copied directly from window render buffer 524, which now functions as window scanout buffer 526. On the other hand, while the composite graphical data is being copied from window render buffer 524 to texture buffer 512, the subsequent rendering or updating of composite graphical data occurs in window scanout buffer 526, which now functions as window render buffer 524.

As shown in FIG. 5A, dom0 actual buffers 510 includes a texture buffer 512, a display server render buffer 514, and a display server scanout buffer 516. Texture buffer 512 can receive composite graphical data, such as texture meshes, from window scanout buffer 526. As described above, a display server program can respond to a command (e.g., a "FENCE" command) when copying the composite graphical data to texture buffer 512 is complete. The display server program is a program that communicates with applications, toolkits, display server client lib, Open GL applications, and the operating systems or kernels. The display server program includes, for example, X-server (X.org) program and Wayland compositor program. The display server program is also a program that interacts with graphic applications, the operating system, and the hardware resources such as GPUs. In some embodiments, graphic applications and the display server program interact, for example, with each other through functional calls, such as an Open GL application programming interface (API) call, for rendering of 2D or 3D images.

As an example, in some embodiments, the display server program instructs a GPU to copy the composite graphical data, such as texture meshes, from texture buffer 512 to display server render buffer 514. The composite graphical data stored in texture buffer 512, display server buffer 514, and display server scanout buffer 516 are accessed and processed by hardware resources such as GPUs with the assistance of functional calls. The composite graphical data stored in display server render buffer 514 is rendered to images including one or more 2D or 3D surfaces so that the GPU can use to drive a display device (e.g., display device 224). After rendering of the composite graphical data stored in display server buffer 514 is complete, the display server program instructs the GPU to copy the rendered images including 2D or 3D surfaces to display server scanout buffer 516. Display server scanout buffer 516 is, for example, a frame buffer (e.g., frame buffer 316) for driving the display device.

As described above, in a virtualized environment, for displaying graphical data generated by applications executed by a domU virtual machine, frequent copying of large amount of graphical data can be required. For example, each time windows 521A-D generates updated graphical data, the graphic driver program needs to copy the updated graphical data from domU actual buffers 520 to dom0 actual buffers 510. In a system where multiple domU virtual machines exist, the frequent copying of large amount of graphical data can use a substantial portion of the processor (e.g., CPU) resources.

Figure 5B:
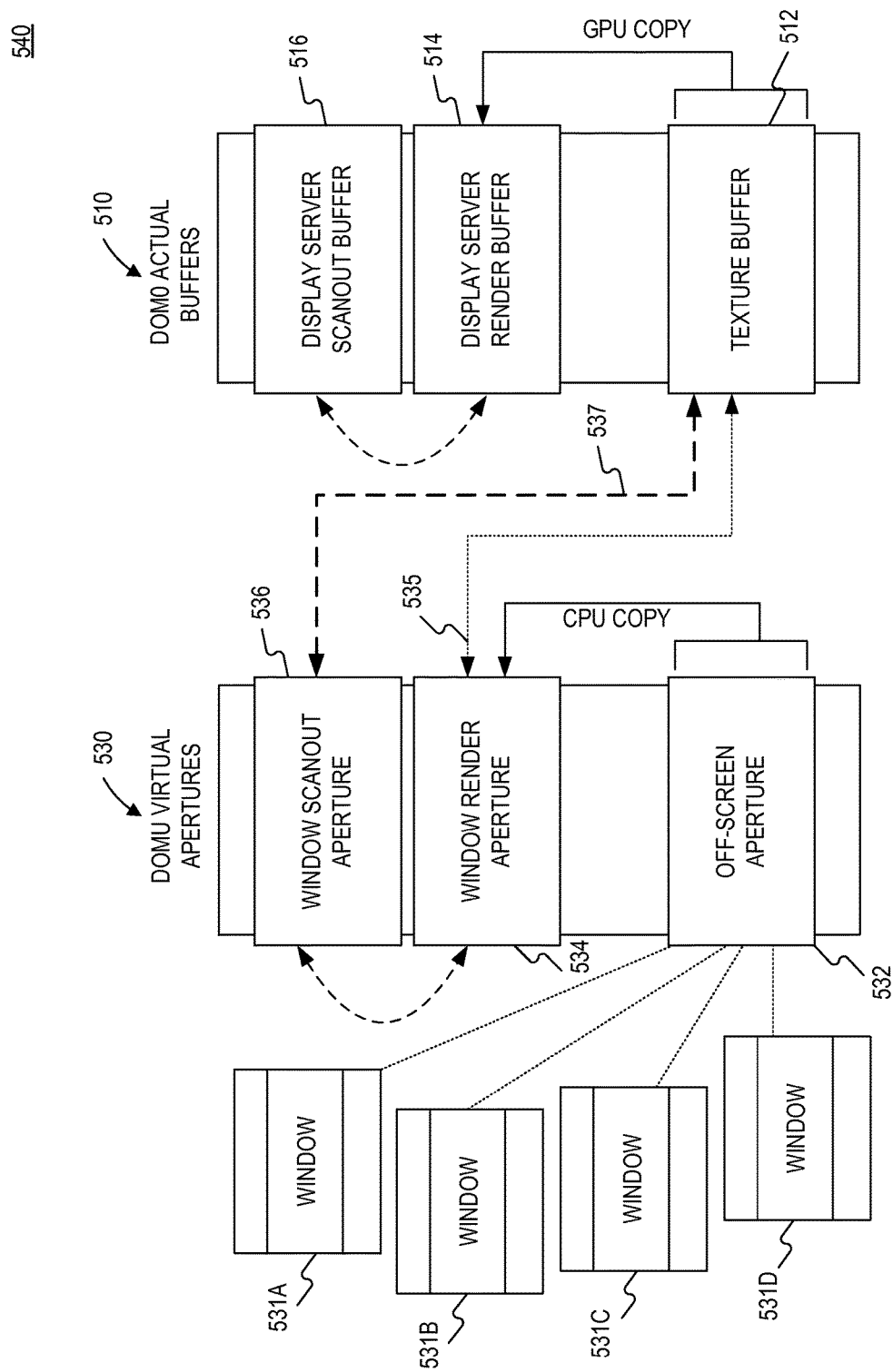
FIG. 5B is a block diagram illustrating an exemplary display driver model for providing graphical data generated by a virtual machine for displaying, consistent with embodiments of the present disclosure.

FIG. 5B is a block diagram illustrating an exemplary display driver model 540 for providing graphical data generated by a virtual machine for displaying. As shown in FIG. 5B, in display driver model 540, a plurality of windows 531A-D can be provided by applications executed by a domU operating system (e.g., domU-1 operating system 330A) of a domU virtual machine. The domU virtual machine can be associated with domU virtual apertures 530 in a virtual memory space (e.g., virtual memory space 420). Windows 531A-D can be, for example, displays of their corresponding desktops or applications such as web applications, video applications, 2D or 3D graphics applications, etc. Applications associated with windows 531A-D can request access to domU virtual apertures 530 from the domU operating system.

As described above, addresses of virtual apertures can be mapped to addresses of actual buffers by using a page table (e.g., page table 400). Therefore, domU virtual apertures 530 can be mapped to domU actual buffers in a physical memory space allocated for the domU virtual machine. Moreover, in some embodiments, domU virtual apertures 530 can also be mapped to dom0 actual buffers 510. In some embodiments, domU virtual apertures 530 can include an off-screen aperture 532, a window render aperture 534, and a windows scanout aperture 536.

In particular, off-screen aperture 532, window render aperture 534, and windows scanout aperture 536 are included in domU virtual apertures 530 in a virtual memory space (e.g., virtual memory space 420). In some embodiments, off-screen aperture 532 can be mapped to a domU off-screen buffer (not shown in FIG. 5B) in a physical memory space allocated for the domU virtual machine. As described above, the domU operating system can provide such mapping when applications require. In some embodiments, window render aperture 534 and windows scanout aperture 536 can be mapped to textual buffer 512 in dom0 actual buffers 510 in a physical memory space. For example, the graphic driver program can send a "MAP" command to create a render buffer and a scanout buffer in textual buffer 512, corresponding to window render aperture 534 and windows scanout aperture 536, respectively. The display server program can then use window render aperture 534 and windows scanout aperture 536 effectively as textual buffer 512 through, for example, graphics executing manager (GEM) pointer patches. The details of the operation using the mappings of off-screen aperture 532, window render aperture 534, and windows scanout aperture 536 are described below.

As shown in FIG. 5B, graphical data of windows 531A-D can be transmitted or sent to off-screen aperture 532. The graphical data of windows 531A-D can be generated by, for example, applications executed by the domU operating system of a domU virtual machine. The graphical data can be 2D data and/or 3D data. For example, the graphical data of windows 531A-D can correspond to 3D desktop objects in the domU operating system, such as a Window 7 operating system. Moreover, the graphical data can be updated in any manner in any time as the applications desire. As a result, the off-screen aperture 532 can receive updated graphical data in any time from applications corresponding to windows 531A-D.

In some embodiments, after off-screen aperture 532 receives graphical data from windows 531A-D, the graphical data can be copied from off-screen aperture 532 to window render aperture 534 for further rending a composite window, such as a full-screen desktop. As described above, the graphical data of windows 531A-D can correspond to 3D desktop objects in the domU operating system, such as a Window 7 operating system. Thus, the graphical data associated with off-screen aperture 532 can represent 3D desktop objects (e.g., windows 531A-D) hosted by a desktop. For rendering the desktop hosting the 3D desktop objects, the graphic driver program, such as the WDDM driver program, can instruct the processor to copy the graphical data stored in off-screen aperture 532 to window render aperture 534. In window render aperture 534, the graphic driver program can instruct the processor to render composite graphical data representing the desktop and all windows (e.g., windows 531A-D) hosted by the desktop. In some embodiments, the composite graphical data can be represented by textured meshes used for rendering 2D or 3D images, such as images of a full-screen desktop.

In some embodiments, the graphic driver program, such as the WDDM driver program, can render and/or update the composite graphical data in window render aperture 534 corresponding to a partial update or a full-screen update. As an example, off-screen aperture 532 can receive update from window 531A, but not from other windows 531B-D. As a result, graphical data stored in off-screen aperture 532 can be partially updated with the new graphical data corresponding to the update from window 531A. The graphic driver program can thus instruct the processor to make a copy of the partially updated graphical data from off-screen aperture 532 to window render aperture 534. Correspondingly, composite graphical data in window render aperture 534 can be partially updated as well.

As described above, off-screen aperture 532 can be mapped to the domU off-screen buffer (not shown in FIG. 5B) in a physical memory space allocated for the domU virtual machine. And window render aperture 534 can be mapped to a render buffer in textual buffer 512 of dom0 actual buffers 510. After the graphic driver program instructs the processor to copy the graphical data from off-screen aperture 532 to window render aperture 534, or render composite graphical data in window render aperture 534, the domU operating system (e.g., domU-1 operating system 330A) or a dom0 operating system (e.g., dom0 operating system 320) can provide the page table containing the mapping between off-screen aperture 532 and the domU actual buffers in a physical memory space allocated for domU virtual apertures 530, and the mapping between window render aperture 534 and the render buffer in textual buffer 512. As a result, after the graphic driver program instructs the processor to copy the graphical data from off-screen aperture 532 to window render aperture 534, the graphical data is copied from the domU off-screen buffer in the physical memory space to the render buffer in textual buffer 512 of dom0 actual buffers 510. And similarly, after the graphic driver program instructs the processor to render composite graphical data in window render aperture 534, the composite graphical data is rendered in the render buffer in textual buffer 512 of dom0 actual buffers 510. In this manner, copying from a domU window render buffer (e.g., window render buffer 524) to textual buffer 512 can be avoided.

In particular, as an example, for mapping the addresses of window render aperture 534 to addresses of the render buffer in textual buffer 512, the graphic driver program can send a configuration command (e.g., a MAP command 535) to create a render buffer in textual buffer 512 of dom0 actual buffers 510. The render buffer can thus be mapped to window render aperture 534 of domU virtual apertures 530 in a page table. As a result of the mapping, any update of the composite graphical data in window render aperture 534 can actually occur in the render buffer in textual buffer 512.

In some embodiments, the graphical data associated with off-screen aperture 532 can be substantially or completely updated with the new graphical data corresponding to updates from one or more windows 531A-D. The graphic driver program can then instruct the processor to copy the updates from off-screen aperture 532 to window render aperture 534. Under this circumstance, the graphic driver program can instruct the processor to simply re-render new composite graphical data in window render aperture 534 using the updates provided by off-screen aperture 532.

In some embodiments, window scanout aperture 536 and window render aperture 534 can be functionally exchanged. As an example, after a rendering of composite graphical data in window render aperture 534 is complete, the graphic driver program can instruct the processor to exchange the two pointers to window render aperture 534 and window scanout aperture 536, so that window render aperture 534 functions as window scanout aperture 536 for providing the composite graphical data. As an example, the graphic driver program can send a "FLIP" command to exchange the pointers. On the other hand, the subsequent rendering or updating of composite graphical data can occur in window scanout aperture 536, which functions as window render aperture 534.

As described above, addresses of window scanout aperture 536 can also be mapped to the scanout buffer in textual buffer 512 in a physical memory space. As a result, the fully updated composite graphical data, such as data of a fully updated full-screen desktop, need not be physically copied. As an example, the graphic driver program can send a configuration command (e.g., a MAP command 537) to create the scanout buffer in textual buffer 512 of dom0 actual buffers 510. The scanout buffer can thus be mapped to window scanout aperture 536 in domU virtual apertures 530 in a page table.

As a result of the mapping, the newly rendered composite graphical data in window scanout aperture 536 can actually exist in the scanout buffer in textual buffer 512. In some embodiments, the display server program can use the render buffer and/or scanout buffer created by, for example, commands 535 and 537, as effectively the texture buffer 512. As an example, the display server program can use the render buffer and/or scanout buffer through patches generated by a direct rendering manager (DRM) program. A DRM program is a system for providing efficient video acceleration (e.g., 3D video acceleration). A DRM program can be included in an operating system such as a Linux/Unix kernel and interact with the display server program through functional calls. A DRM program can be hardware specific and can include one or more in-kernel drivers. A DRM program can include a graphics execution manager (GEM) program and/or a translation table maps (TTM) manager program.

As an example, the GEM program can manage graphic memories and controls the execution context for graphics-related programs. The GEM program can enable multiple applications to share graphics device resources and provide sharing of data between applications. The GEM program can also interact with page tables to manipulate mappings between addresses in a virtual memory spaces and addresses in a physical memory space. As a result, the GEM program can provide pointer patches to enable the display server program to use the render buffer and/or scanout buffer created in dom0 actual buffers 510 as effectively texture buffer 512. In particular, as an example, a "modeset_create_fb" function of the GEM program can be used to create "dumb-buffers," such as the render buffer and/or scanout buffer. The size of the "dumb-buffers" can be selected or specified. The "modeset_create_fb" function can also request the graphic driver program to prepare the "dumb-buffers" for memory mapping using page tables. After the mapping can be established, an "mmap( )" functional call can be used to effectively use the "dumb-buffers" as effectively texture buffer 512, such as a frame buffer. Exemplary GEM code for the "modeset_create_fb" function can be found, for example, on websites such as github.com.

In some embodiments, the display server program can instruct a GPU to transmit, such as copy, the composite graphical data, such as texture meshes, from the render buffer or scanout buffer created in textual buffer 512 to display server render buffer 514. In some embodiments, the composite graphical data stored in render buffer or scanout buffer created in textual buffer 512, display server buffer 514, and display server scanout buffer 516 can be accessed and processed by hardware resources such as GPUs with the assistance of functional calls from graphic applications. The composite graphical data stored in display server render buffer 514 can be rendered to images including one or more 2D or 3D surfaces so that the GPU can use to drive a display device (e.g., display device 224). After rendering of the composite graphical data stored in display server buffer 514 is complete, the display server program can instruct the GPU to copy the rendered images including 2D or 3D surfaces to display server scanout buffer 516. Display server scanout buffer 516 can be, for example, a frame buffer for driving the display device.

Figure 5C:
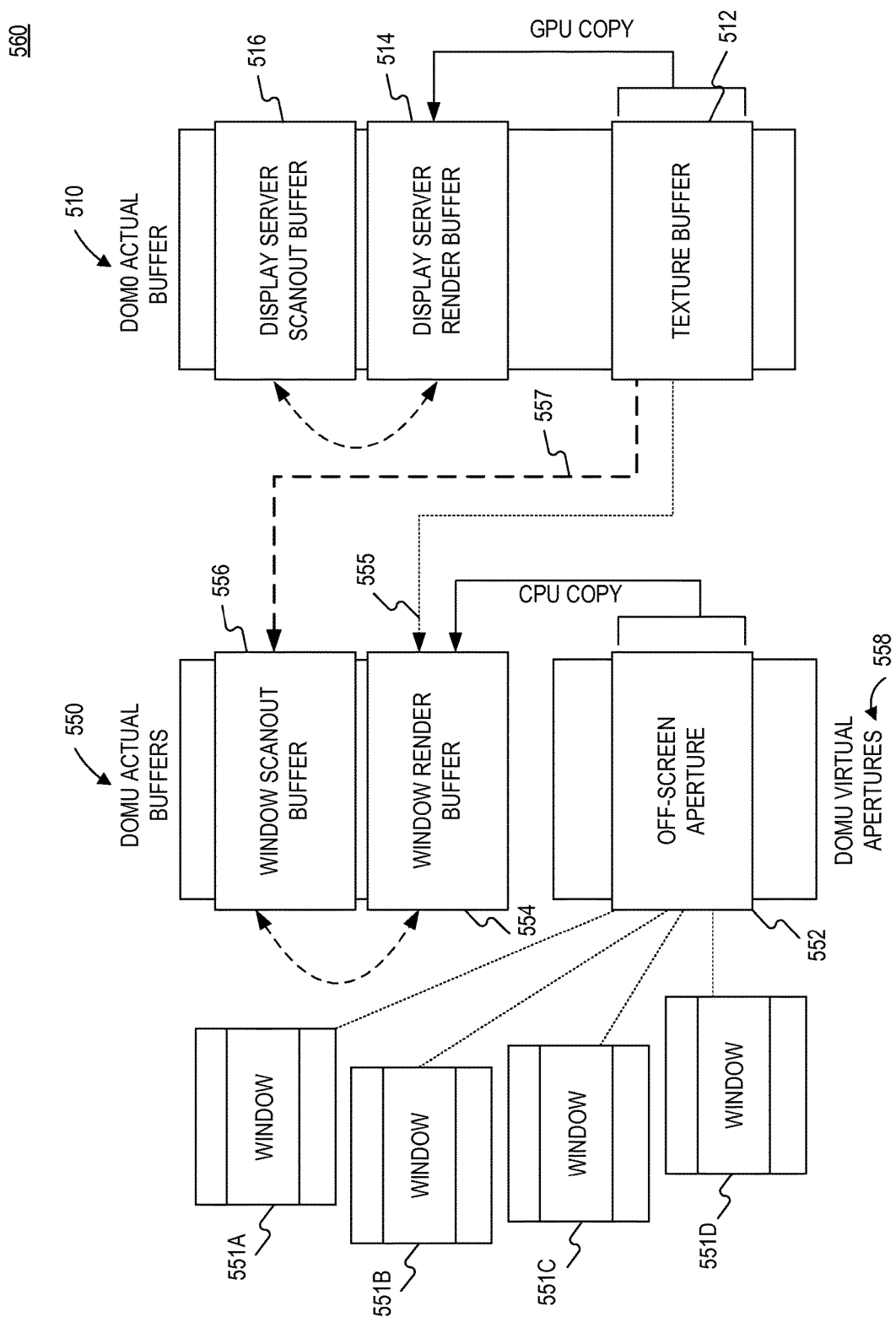
FIG. 5C is a block diagram illustrating another exemplary display driver model for providing graphical data generated by a virtual machine for displaying, consistent with embodiments of the present disclosure.

FIG. 5C is a block diagram illustrating another exemplary display drive model 560 for providing graphical data generated by a virtual machine for displaying. As shown in FIG. 5C, in display drive model 560, a plurality of windows 551A-D can be provided by applications executed by a domU operating system (e.g., domU-1 operating system 330A) of a domU virtual machine. The domU virtual machine can be associated with domU actual buffers 550 in a physical memory space (e.g., physical memory space 440). The domU virtual machine can also be associated with domU virtual apertures 558 in a virtual memory space (e.g., virtual memory space 420). Windows 551A-D can be, for example, displays of their corresponding desktops or applications such as web applications, video applications, 2D or 3D graphics applications, etc. Applications associated with windows 551A-D can request access to domU virtual apertures 558.

As described above, virtual addresses can be mapped to physical memory addresses by using a page table (e.g., page table 400). Therefore, domU virtual apertures 558 can be mapped to domU actual buffers in a physical memory space allocated for the domU virtual machine. Moreover, in some embodiments, domU actual buffers 550 can also be mapped to dom0 actual buffers 510. In some embodiments, domU virtual apertures 558 can include an off-screen aperture 552. And domU actual buffers 550 can include a window render buffer 554 and a window scanout buffer 556.

In particular, off-screen aperture 552 is included in domU virtual apertures 558 in a virtual memory space (e.g., virtual memory space 420). In some embodiments, off-screen aperture 552 can be mapped to a domU off-screen buffer (not shown in FIG. 5C) in a physical memory space allocated for the domU virtual machine. As described above, the domU operating system can provide such mapping when applications require. Moreover, in some embodiments, window render buffer 554 and window scanout buffer 556 can be mapped to textual buffer 512 in dom0 actual buffers 510 in a physical memory space. For example, because window render buffer 554 and window scanout buffer 556 already exist in the domU actual buffers in the physical memory space, the display server program can then use window render buffer 554 and window scanout buffer 556 effectively as textual buffer 512 though, for example, GEM paging back. The details of the operation using the mappings of off-screen aperture 532, window render buffer 554, and window scanout buffer 556 are described below.

As shown in FIG. 5C, graphical data of windows 551A-D can be transmitted or sent to off-screen aperture 552. The graphical data of windows 551A-D can be generated by, for example, applications executed by the domU operating system of a domU virtual machine. The graphical data can be 2D data and/or 3D data. For example, the graphical data of windows 551A-D can correspond to 3D desktop objects in the domU operating system, such as a Window 7 operating system. Moreover, the graphical data can be updated in any manner in any time as the applications desire. As a result, off-screen aperture 552 can be updated in any time by applications corresponding to windows 551A-D.

In some embodiments, after off-screen aperture 552 receives graphical data from windows 551A-D, the graphical data can be copied from off-screen aperture 552 to window render buffer 554 for further rending a composite window, such as a full-screen desktop. As described above, the graphical data of windows 551A-D can correspond to 3D desktop objects in the domU operating system, such as a Window 7 operating system. Thus, the graphical data stored in off-screen aperture 552 can represent 3D desktop objects (e.g., windows 551A-D) hosted by a desktop. For displaying the desktop hosting the 3D desktop objects, the graphic driver program, such as the WDDM driver, can instruct a processor to copy the graphical data associated with off-screen aperture 552 to window render buffer 554. In window render buffer 554, the graphic driver program can instruct the processor to render composite graphical data representing the desktop and all windows (e.g., windows 551A-D) hosted by the desktop. In some embodiments, the composite graphical data can be represented by textured meshes used for rendering 2D or 3D images, such as images of a full-screen desktop.

The graphic driver program, such as the WDDM driver, can also render and/or update the composite graphical data in window render buffer 554 corresponding to a partial update or a full-screen update. As an example, off-screen aperture 552 can receive one or more updates from window 551A, but not from other windows 551B-D. As a result, graphical data stored in off-screen aperture 552 can be partially updated with the new graphical data corresponding to the update from window 551A. The graphic driver program can thus instruct the processor to make a copy of the partially updated graphical data from off-screen aperture 552 to window render buffer 554. Correspondingly, composite graphical data in window render buffer 554 can be partially updated as well.

As described above, off-screen aperture 552 can be mapped to the domU off-screen buffer (not shown in FIG. 5C) in the physical memory space allocated for the domU virtual machine. And window render buffer 554 can be mapped to textual buffer 512 of dom0 actual buffers 510. Therefore, after the graphic driver program instructs the processor to copy the graphical data from off-screen aperture 552 to window render buffer 554, or render composite graphical data in window render buffer 554, the domU operating system (e.g., domU-1 operating system 330A) or a dom0 operating system (e.g., dom0 operating system 320) can provide the page table containing the mapping between off-screen aperture 552 and domU off-screen buffer in the physical memory space allocated for the domU virtual machine, and mapping between window render buffer 554 and textual buffer 512. As a result, after the graphic driver program instructs the processor to copy the graphical data from off-screen aperture 552 to window render buffer 554, the graphical data is copied from the domU off-screen buffer in the physical memory space to window render buffer 554, which functions as textual buffer 512. And similarly, after the graphic driver program instructs the processor to render composite graphical data in window render buffer 534, the composite graphical data is rendered as if it is in textual buffer 512 of dom0 actual buffers 510. In this manner, copying from a domU window render buffer (e.g., window render buffer 524) to textual buffer 512 can be avoided.

In particular, as an example, for mapping the addresses of window render buffer 554 to textual buffer 512, the GEM program can manipulate the page table so that addresses of window render buffer 554 correspond to addresses of textural buffer 512 in dom0 actual buffers 510. For example, the GEM program can make functional calls to change the page table such that virtual addresses of window render buffer 554 can map to the physical addresses of textural buffer 512 in dom0 actual buffers 510, instead of mapping to the addresses of window render buffer 554's own allocated physical memories. As a result of the mapping, window render buffer 554 can effectively be used as textual buffer 512, so that a copying of the composite graphical data from window render buffer 554 to textual buffer 512 can be avoided. In particular, as an example, a "modeset_create_fb" function of the GEM program can be used to create "dumb-buffers," such as window render buffer 554. The size of the "dumb-buffers" can be selected or specified. The "modeset_create_fb" function can also request the display server program to prepare the "dumb-buffers" for memory mapping using page tables. After the mapping is established, an "mmap( )" functional call can be used to effectively use the "dumb-buffers" as effectively texture buffer 512, such as a frame buffer. Exemplary GEM code for the "modeset_create_fb" function can be found, for example, on websites such as github.com.

In some embodiments, graphical data associated with off-screen aperture 552 can be substantially or completely updated with the new graphical data corresponding to updates received from all windows 551A-D. The graphic driver program can then instruct the processor to copy the updates from off-screen aperture 552 to window render buffer 554. Under this circumstance, the graphic driver program can instruct the processor to simply re-render new composite graphical data in window render buffer 554 using the updates received from off-screen aperture 552.

In some embodiments, window scanout buffer 556 and window render buffer 554 can be functionally exchanged. As an example, after a rendering of composite graphical data is complete, the graphic driver program can instruct the processor to exchange the two pointers to window render buffer 554 and window scanout buffer 556, so that window rendering buffer 554 functions as window scanout buffer 556 for providing the composite graphical data. As an example, the graphic driver program can send a "FLIP" command to exchange the pointers. On the other hand, the subsequent rendering or updating of composite graphical data can occur in window scanout buffer 556, which functions as window render buffer 554.

As described above, addresses of window scanout buffer 556 can also be mapped to addresses of textual buffer 512 in dom0 actual buffers 510 in a physical memory space. As a result, the fully updated composite graphical data, such as data of a fully updated full-screen desktop, need not be physically copied. In particular, as an example, the DRM program can manipulate the page table so that addresses of window scanout buffer 556 correspond to addresses of textural buffer 512 in dom0 actual buffers 510. For example, the GEM program can make functional calls to change the page table such that virtual addresses of window scanout buffer 556 can map to the addresses of textual buffer 512 in dom0 actual buffers 510, instead of mapping to the addresses of window scanout buffer 556's own allocated physical memories. As a result of the mapping, window scanout buffer 556 can effectively be used as textual buffer 512, and copying of the composite graphical data from window scanout buffer 556 to textual buffer 512 can be avoided.

Moreover, as a result of the mapping, in some embodiments, the display server program can also use window scanout buffer 556 effectively as texture buffer 512. As an example, the display server program can use window scanout buffer 556 as textual buffer 512 through pointer patches generated by the GEM program. In particular, as an example, a "modeset_create_fb" function of the GEM program can be used to create "dumb-buffers," such as window scanout buffer 556. The size of the "dumb-buffers" can be selected or specified. The "modeset_create_fb" function can also request the display server program to prepare the "dumb-buffers" for memory mapping using page tables. After the mapping is established, an "mmap( )" functional call can be used to effectively use the "dumb-buffers" as effectively texture buffer 512, such as a frame buffer. Exemplary GEM code for the "modeset_create_fb" function can be found, for example, on websites such as github.com.

In some embodiments, the display server program can instruct a GPU to copy the composite graphical data, such as texture meshes, from window scanout buffer 556, via GEM patches, to display server buffer 514. In some embodiments, the composite graphical data stored in window scanout buffer 556 functioning as textual buffer 512, display server buffer 514, and display server scanout buffer 516 can be accessed and processed by hardware resources such as GPUs with the assistance of functional calls from graphic applications. The composite graphical data stored in display server render buffer 514 can be rendered to images including one or more 2D or 3D surfaces so that the GPU can use to drive a display device (e.g., display device 224). After rendering of the composite graphical data stored in display server buffer 514 is complete, the display server program can instruct the GPU to copy the rendered images including 2D or 3D surfaces to display server scanout buffer 516. Display server scanout buffer 516 can be, for example, a frame buffer for driving the display device.

Figure 5D:
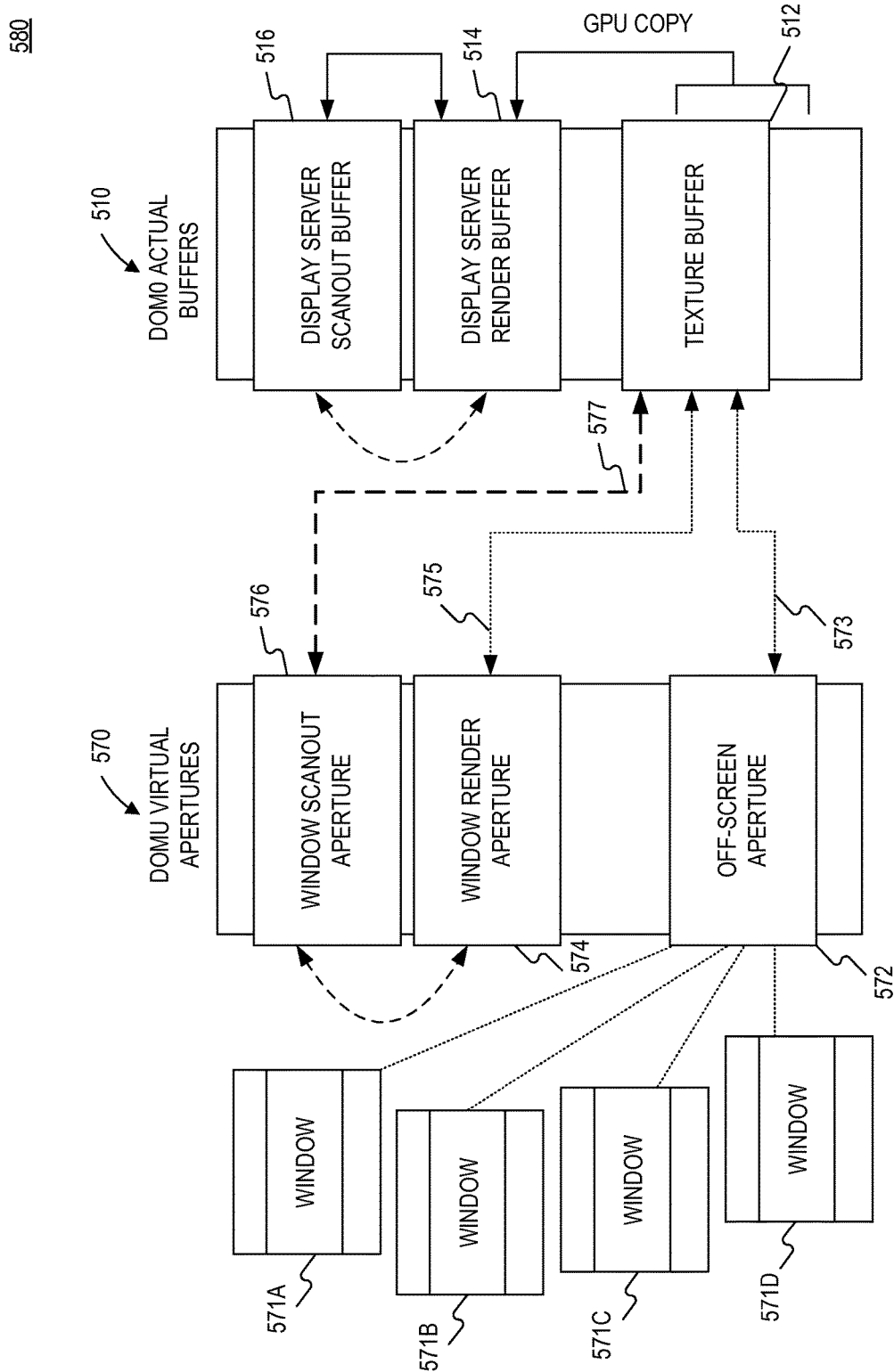
FIG. 5D is a block diagram illustrating another exemplary display driver model for providing graphical data generated by a virtual machine for displaying, consistent with embodiments of the present disclosure.

FIG. 5D is a block diagram illustrating another exemplary display driver model 580 for providing graphical data generated by a virtual machine for displaying. As shown in FIG. 5D, in display driver model 580, a plurality of windows 571A-D can be provided by applications executed by a domU operating system (e.g., domU-1 operating system 330A). The domU operating system can be allocated with domU virtual apertures 570 in a virtual memory space (e.g., virtual memory space 420). Windows 571A-D can be, for example, displays of their corresponding desktops or applications such as web applications, video applications, 2D or 3D image applications, etc. Applications associated with windows 571A-D can request access to domU virtual apertures 570. As described above, addresses in a virtual memory space can be mapped to addresses in a physical memory space by using a page table (e.g., page table 400). In some embodiments, domU virtual apertures 570 can be mapped to dom0 actual buffers 510. In some embodiments, domU virtual apertures 570 can include an off-screen aperture 572, a window render aperture 574, and a windows scanout aperture 576.

In particular, off-screen aperture 572, window render aperture 574, and windows scanout aperture 576 are included in domU virtual apertures 570 in a virtual memory space (e.g., virtual memory space 420). In some embodiments, off-screen aperture 572, window render aperture 534, and windows scanout aperture 536 can be mapped to textual buffer 512 in dom0 actual buffers 510 in a physical memory space. For example, the graphic driver program can send a "MAP" command to create an off-screen buffer, a render buffer, and a scanout buffer in textual buffer 512, corresponding to off-screen aperture 572, window render aperture 574 and windows scanout aperture 576, respectively. The display server program can then use window render aperture 534 and windows scanout aperture 536 effectively as textual buffer 512 through, for example, graphics executing manager (GEM) pointer patches. The details of the operation using the mappings of off-screen aperture 572, window render aperture 574, and windows scanout aperture 576 are described below.

As shown in FIG. 5D, graphical data of windows 571A-D can be transmitted or sent to off-screen aperture 572. The graphical data of windows 571A-D can be generated by, for example, applications executed by the domU operating system of a domU virtual machine. The graphical data can be 2D data and/or 3D data. For example, the graphical data of windows 571A-D can correspond to 3D desktop objects in the domU operating system, such as a Window 7 operating system. Moreover, the graphical data can be updated in any manner in any time as the applications desire. As a result, off-screen aperture 572 can be updated in any time by applications corresponding to windows 571A-D.

As described above, off-screen aperture 572 can be mapped to the off-screen buffer created in texture buffer 512. As a result, the graphical data received by off-screen aperture 572 need not be physically sent to physical memories allocated for domU actual buffers (e.g., domU-1 actual buffers 442), but instead can be sent to the off-screen buffer created in texture buffer 512. In particular, as an example, the graphic driver program can send a command (e.g., a "MAP" command 573) to create the off-screen buffers in texture buffer 512. The off-screen buffer in texture buffer 512 can thus be mapped to off-screen aperture 572 in a page table. As a result, after windows 571A-D request to transmit graphical data to off-screen aperture 572, the graphic driver program can copy the graphical data to the off-screen buffer in in texture buffer 512.

Similar to that of windows off-screen aperture 572, addresses of window render aperture 574 and windows scanout aperture 576 can also be mapped to physical addresses of textual buffer 512 in dom0 actual buffer 510. In particular, as an example, the graphic driver program can send commands (e.g., map commands 575 and 577) to create a render buffer and a scanout buffer in textual buffer 512. The render buffer and the scanout buffer can thus be mapped to window render aperture 574 and windows scanout aperture 576, respectively, in a page table. As a result of the mapping, any update of the composite graphical data in window render aperture 574 and window scanout aperture 576 can actually occur in the render buffer and the scanout buffer in textual buffer 512 of dom0 actual buffers 510.

In some embodiments, after off-screen aperture 572 receives graphical data or update of the graphical data from windows 571A-D, the graphical data need to be copied from off-screen aperture 572 to window render aperture 574 for further rending a composite window, such as a full-screen desktop. As described above, the graphical data of windows 571A-D can correspond to 3D desktop objects in the domU operating system, such as a Window 7 operating system. Thus, the graphical data stored in window off-screen aperture 572 can represent 3D desktop objects (e.g., windows 571A-D) hosted by a desktop. For rendering the desktop hosting the 3D desktop objects, the graphic driver program can instruct the processor to copy the graphical data associated with window off-screen aperture 572 to window render aperture 574. Because of the mapping as described above, the graphical data can be essentially copied from the off-screen buffer in textual buffer 512 to the render buffer in textual buffer 512. As an example, the WDDM driver can use a "BLT" command to perform the copying function.

Moreover, in window render aperture 574, the graphic driver program can render composite graphical data representing the desktop and all windows (e.g., windows 571A-D) hosted by the desktop. In some embodiments, the composite graphical data can be represented by textured meshes used for rendering 2D or 3D images, such as images of a full-screen desktop. As described above, because the window off-screen aperture 572 and window render aperture 574 are now all mapped to textual buffer 512 of dom0 actual buffer 510, the rendering of composite graphical data can also occur in the render buffer in textual buffer 512 of dom0 actual buffers 510. As a result, copying graphical data from domU actual buffers associated with a domU virtual machine to dom0 actual buffers 510 can be avoided.

In some embodiments, the graphic driver program can also render and/or update the composite graphical data in window render aperture 574 corresponding to a partial update or a full-screen update. As an example, window off-screen aperture 572 can receive update from window 571A, but not from other windows 571B-D. As a result, graphical data associated with window off-screen aperture 572 can be partially updated with the new graphical data corresponding to the update received from window 571A. The graphic driver program can thus instruct the processor to make a copy of the partially updated graphical data from off-screen aperture 572 to window render aperture 574. Correspondingly, composite graphical data in window render aperture 574 can be partially updated as well. Due to the mapping as described above, this partial update of composite graphical data can also be made from the off-screen buffer in textual buffer 512 to the render buffer in textual buffer 512.

In some embodiments, graphical data associated with off-screen aperture 572 can be substantially or completely updated with the new graphical data corresponding to updates from one or more windows 571A-D. The graphic driver program can then instruct the processor to copy the updates from off-screen aperture 572 to window render aperture 574. Under this circumstance, the graphic driver program can instruct the processor to simply re-render new composite graphical data in window render aperture 574 using the updates from off-screen aperture 572. Due to the mapping as described above, this re-rendering of composite graphical data can also occur in the render buffer in textual buffer 512 of dom0 actual buffer 510.

In some embodiments, window scanout aperture 576 and window render aperture 574 can be functionally exchanged. As an example, after a rendering of composite graphical data is complete, the graphic driver program can instruct the processor to exchange the two pointers to window render aperture 574 and window scanout aperture 576, so that window rendering buffer 574 functions as window scanout aperture 576 for providing the composite graphical data. As an example, the graphic driver program can send a "FLIP" command to exchange the pointers. On the other hand, the subsequent rendering or updating of composite graphical data can occur in window scanout aperture 576, which functions as window render aperture 574.

As described above, addresses of window scanout aperture 576 can also be mapped to addresses of textual buffer 512 in dom0 actual buffers 510. As a result, the fully updated composite graphical data, such as data of a fully updated full-screen desktop, need not be physically copied. For example, the newly rendered composite graphical data in window scanout aperture 576 due to the swapping can actually exist in the scanout buffer created in textual buffer 512. In some embodiments, the display server program can use the render buffer or scanout buffer created by, for example, commands 575 and 577, as effectively texture buffer 512. As an example, the display server program can use the render buffer or scanout buffer through pointer patches generated by the GEM program. The GEM program can interact with page tables to manipulate mappings between addresses of domU virtual apertures 570 and addresses of dom0 actual buffers 510. As a result, the GEM program can provide pointer patches to enable the display server program to use the render buffer or scanout buffer in texture buffer 512. For example, the display server can perform hardware "BLT" and synchronization to use the render buffer or scanout buffer in textual buffer 512.

Figure 6:
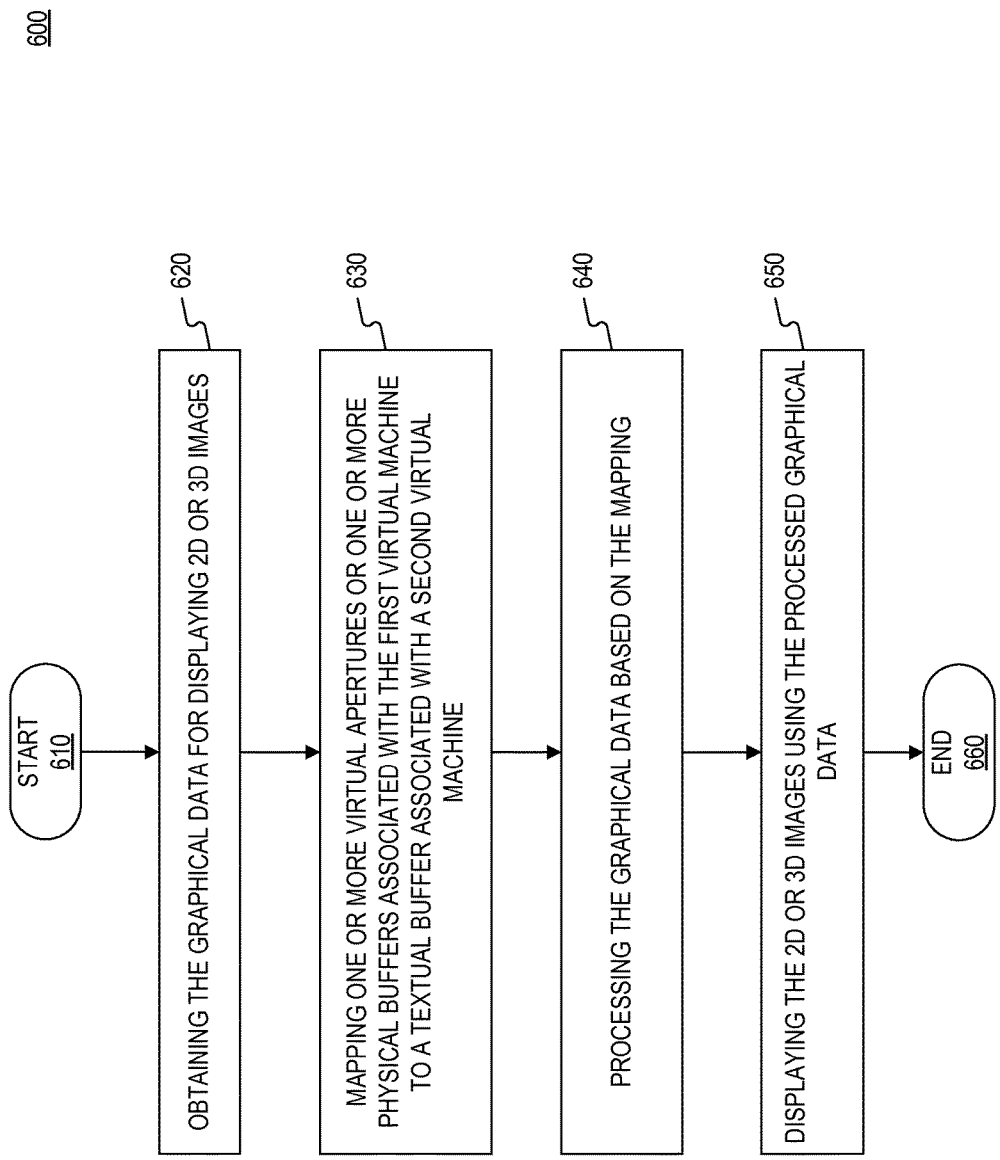
FIG. 6 is a flowchart of an exemplary method for displaying 2-D or 3-D images, consistent with embodiments of the present disclosure.

In some embodiments, the display server program can instruct a GPU to copy the composite graphical data, such as texture meshes, from the render buffer and/or scanout buffer created in textural buffer 512, via GEM patches, to display server buffer 514. In some embodiments, the composite graphical data stored in the off-screen buffer, the render buffer, and the scanout buffer in texture buffer 512, display server buffer 514, and display server scanout buffer 516 can be accessed and processed by hardware resources such as GPUs with the assistance of functional calls from graphic applications. The composite graphical data stored in display server render buffer 514 can be rendered to images including one or more 2D or 3D surfaces so that the GPU can use to drive a display device (e.g., display device 224). After rendering of the composite graphical data stored in display server buffer 514 is complete, the display server program can instruct the GPU to copy the rendered images including 2D or 3D surfaces to display server scanout buffer 516. Display server scanout buffer 516 can be, for example, a frame buffer for driving the display device FIG. 6 is a flowchart of an exemplary method 600 for displaying 2D or 3D images. It will be readily appreciated that the illustrated procedure can be altered to delete steps or further include additional steps. After initial step 610, a graphical driver program (e.g., a WDDM driver program) can instruct a processor, such as a CPU (e.g., CPUs 221), to obtain (620) graphical data for displaying 2D or 3D images. The graphical data can be generated by one or more applications associated with a first virtual machine. The first virtual machine can be domU type virtual machine. The graphical data can be 2D data and/or 3D data. For example, the graphical data can correspond to 3D desktop objects in the domU operating system, such as a Window 7 operating system. Moreover, the graphical data can be updated in any manner in any time as the applications desire.

After obtaining the graphical data, the processor can be instructed to establish (630) mapping of one or more virtual apertures or one or more actual buffers associated with the first virtual machine to a textual buffer associated with a second virtual machine. The second virtual machine can be a dom0 type virtual machine that has access to hardware resources, such as a GPU and a display device. The mapping can be established, for example, using a page table that is maintained by an operating system, such as virtual operating system, of the first virtual machine or the second virtual machine. It is appreciated that the mapping can also be performed with respect to more than one first virtual machines, which can be domU type virtual machines.

In some embodiments, the processor can be instructed to establish mapping of a window render aperture and a window scanout aperture, in a virtual memory space associated with the first virtual machine, to the textual buffer associated with a second virtual machine. In particular, the graphical driver program can instruct the processor to provide a render buffer and a scanout buffer in the textual buffer associated with the second virtual machine. The render buffer and the scanout buffer can correspond to the window render aperture and the window scanout aperture associated with the first virtual machine, respectively. As an example, the graphical driver program can instruct the processor to create the render buffer and scanout buffer by allocating corresponding physical memory spaces in the textual buffer associated with the second virtual machine.

After the render buffer and scanout buffer are created, a kernel program, such as a GEM program, can instruct the processor to establish mapping of the window render aperture and the window scanout aperture to the render buffer and the scanout buffer, respectively, using a page table. The kernel program can interact with the page table to manipulate mappings between virtual addresses of the window render aperture and the window scanout aperture in a virtual memory space and addresses of the corresponding render buffer and scanout buffer in the textual buffer. The kernel program can be a program executing within the operating system of the first virtual machine or the second virtual machine.

In some embodiments, the graphical driver program can further instruct the processor to provide an off-screen buffer in the textual buffer associated with the second virtual machine. The off-screen buffer can correspond to an off-screen aperture associated with the first virtual machine. For example, the graphical driver program can instruct the processor to create the off-screen buffer by allocating corresponding memory spaces in the textual buffer associated with the second virtual machine. After the off-screen buffer is created, the kernel program can instruct the processor to establish a mapping of the off-screen aperture to the off-screen buffer using the page table. As an example, the kernel program can interact with the page table to manipulate mappings, such as create a pointer, between addresses of the off-screen aperture in the virtual memory space and addresses of the off-screen buffer in the textual buffer.

In some embodiments, the processor can be further instructed to establish a mapping of one or more actual buffers associated with the first virtual machine to the textual buffer associated with a second virtual machine. In particular, the graphical driver program (e.g., a WDDM driver program) can instruct the processor (e.g., a CPU) to provide a window render buffer and a window scanout buffer associated with the first virtual machine. As an example, the graphical driver program can instruct the processor to create the window render buffer and the window scanout buffer by allocating corresponding physical memory spaces associated with the second virtual machine (e.g., domU actual buffers 550).

After the one or more actual buffers associated with the first virtual machine are created, the kernel program can establish mapping of the window render buffer and the window scanout buffer to the textual buffer associated with the second virtual machine using a page table. The kernel program can interact with the page table to manipulate mappings, such as using GEM page back, between addresses of the window render buffer and the window scanout buffer and addresses of the textual buffer. The window render buffer, the window scanout buffer, and the textual buffer can all be in a physical memory space.

After the mapping of the one or more virtual apertures or the one or more actual buffers associated with the first virtual machine to a textual buffer associated with a second virtual machine is established, the graphic driver program can instruct the processor to process (640) the graphical data based on the mapping. In particular, in some embodiments, under the circumstances that the mapping of the window render aperture associated with the first virtual machine to the render buffer associated with the second virtual machine and the mapping of the window scanout aperture associated with the first virtual machine to the scanout buffer associated with the second virtual machine are established, the graphic driver program can instruct the processor to store the graphical data in an off-screen buffer corresponding to an off-screen aperture associated with the first virtual machine. The off-screen buffer can include physical memories allocated to the actual buffers of the first virtual machine. Moreover, based on the mapping, the graphic driver program can instruct the processor to transmit, such as copy, the graphical data from the off-screen buffer to the render buffer in the textual buffer associated with the second virtual machine. Furthermore, the graphic driver program can instruct the processor to render a composite graphical data using the graphical data in the render buffer, which is provided in the textual buffer associated with the second virtual machine. In some embodiments, after the composite graphical data is rendered, the graphical driver program can instruct the processor to provide the rendered composite graphical data to the scanout buffer in the textual buffer associated with the second virtual machine. As an example, the rendered composite graphical data can be provided to the scanout buffer by copying or by exchanging pointers to the render buffer and the scanout buffer.

Furthermore, in some embodiments, under the circumstances that mapping of the off-screen aperture associated with the first virtual machine to the off-screen buffer associated with the second virtual machine is also established, the graphical data can be stored in the off-screen buffer associated with the second virtual machine, instead of in the off-screen buffer corresponding to the off-screen aperture associated with the first virtual machine. As a result, based on the mapping, the graphic driver program can instruct the processor to transmit, such as copy, the graphical data from the off-screen buffer associated with the second virtual machine to the render buffer in the textual buffer associated with the second virtual machine. The graphical data can then be processed, such as rendered, in the render buffer associated with the second virtual machine and provided to the scanout buffer associated with the second virtual machine in a similar manner as described above.

In some embodiments, under the circumstances that mapping of the window render buffer and the window scanout buffer associated with the first virtual machine to the textual buffer associated with the second virtual machine is established, the graphic driver program can instruct the processor to store the graphical data in an off-screen buffer corresponding to an off-screen aperture associated with the first virtual machine. The off-screen buffer can include actual buffers in physical memories allocated to the first virtual machine. Moreover, the graphic driver program can also instruct the processor to transmit, such as copy, the graphical data from the off-screen buffer to the window render buffer associated with the first virtual machine. The graphic driver program can also instruct the processor to render a composite graphical data using the graphical data in the window render buffer and provide the rendered composite graphical data to the window scanout buffer. As an example, the rendered composite graphical data can be provided to the window scanout buffer by copying or by exchanging pointers to the render buffer and the scanout buffer.

After the graphical data is processed, a display server program can instruct a processor, such as a GPU (e.g., GPUs 225) to display (650) the 2D or 3D images using the processed graphical data. As described above, the processed graphical data can be stored in the one or more actual buffers associated with the first virtual machine (e.g., the window render buffer and the window scanout buffer) or the textual buffer associated with a second virtual machine. Under the circumstances where the processed graphical data is stored in the one or more actual buffers associated with the first virtual machine (e.g., the window render buffer and the window scanout buffer), the mapping between the actual buffers and the textual buffer associated with the second virtual machine can enable the display server program to use the processed graphical data.

In some embodiments, the display server program can instruct the processor to transmit the processed graphical data to a display server render buffer (e.g., display server render buffer 514) and render the 2D or 3D images using the processed graphical data in the display server render buffer. The display server program can also instruct the processor to provide the rendered 2D or 3D images to a display server scanout buffer and display the rendered 2D or 3D images associated with display server scanout buffer. As an example, the rendered 2D or 3D images can be provided to the display server scanout buffer by copying or by exchanging pointers to the display server render buffer and the display server scanout buffer. In some embodiments, the display server scanout buffer can be a frame buffer (e.g., frame buffer 316). After step 650, process 600 can proceed to an end 660. Process 600 can also be repeated after new or updated graphical data is obtained.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computing device for displaying images that are two dimensional (2D) or three dimensional (3D), the computing device comprising:
    one or more processors configured to
        obtain graphical data that has been generated by one or more applications associated with a first virtual machine;
        map one or more virtual apertures or one or more actual buffers associated with the first virtual machine to a textual buffer associated with a second virtual machine, the virtual apertures being in a virtual memory space and the actual buffers being in a physical memory space, with the mapping based on the following:
            provide a render buffer in the textual buffer associated with the second virtual machine corresponding to a window render aperture associated with the first virtual machine;
            provide a scanout buffer in the textual buffer associated with the second virtual machine corresponding to a window scanout aperture associated with the first virtual machine;
            map the window render aperture to the render buffer using a page table;
            map the window scanout aperture to the scanout buffer using the page table;

provide an off-screen buffer in the textual buffer associated with the second virtual machine corresponding to an off-screen aperture associated with the first virtual machine; and map the off-screen aperture to the off-screen buffer using a page table;

process the graphical data based on the mapping, wherein the processing includes rendering composite graphical data representing a desktop and one or more application windows;

the one or more processors allocate physical memory space in the textual buffer associated with the second virtual machine to provide the off-screen buffer, the render buffer, and the scanout buffer; and a display device configured to display the 2D or 3D images using the processed graphical data, the processed graphical data being stored in the one or more actual buffers associated with the first virtual machine or the textual buffer associated with a second virtual machine.

2. The computing device of claim 1, wherein the first virtual machine is a domU type virtual machine and the second virtual machine is a domO type virtual machine having access to the display device.

3. The computing device of claim 1, wherein the one or more processors process the graphical data in the textual buffer associated with the second virtual machine comprises the one or more processors to:

store the graphical data in an off-screen buffer corresponding to an off-screen aperture associated with the first virtual machine, the off-screen buffer including physical memories allocated to the first virtual machine;

transmit the graphical data from the off-screen buffer to the render buffer in the textual buffer associated with the second virtual machine;

render the composite graphical data using the graphical data in the render buffer; and provide the rendered composite graphical data to the scanout buffer.

4. The computing device of claim 1, wherein the one or more processors process the graphical data in the textual buffer associated with the second virtual machine comprises the one or more processors to:

store the graphical data in the off-screen buffer associated with the second virtual machine, the off-screen buffer including physical memories allocated to the second virtual machine;

transmit the graphical data from the off-screen buffer to the render buffer in the textual buffer associated with the second virtual machine;

render the composite graphical data using the graphical data in the render buffer; and provide the rendered composite graphical data to the scanout buffer.

5. The computing device of claim 1, wherein the mapping by the one or more processors is further based on manipulating a page table via a graphics execution manager.

6. The computing device of claim 1, wherein the display device displays the images using the processed graphical data comprises the display device to:

transmit the processed graphical data to a display server render buffer;

render the images using the processed graphical data in the display server render buffer;

provide the rendered images to a display server scanout buffer; and display the rendered images associated with the display server scanout buffer.

7. A method for displaying images that are two dimensional (2D) or three dimensional (3D), the method being performed by one or more processors and comprising:

obtaining graphical data that has been generated by one or more applications associated with a first virtual machine;

mapping one or more virtual apertures or one or more actual buffers associated with the first virtual machine to a textual buffer associated with a second virtual machine, with the rendered composite graphical data being mapped from the first virtual machine to the second virtual machine without having to be copied, the virtual apertures being in a virtual memory space and the actual buffers being in a physical memory space, with the mapping based on the following:

providing a render buffer in the textual buffer associated with the second virtual machine corresponding to a window render aperture associated with the first virtual machine;

providing a scanout buffer in the textual buffer associated with the second virtual machine corresponding to a window scanout aperture associated with the first virtual machine;

mapping the window render aperture to the render buffer using a page table;

mapping the window scanout aperture to the scanout buffer using the page table;

providing an off-screen buffer in the textual buffer associated with the second virtual machine corresponding to an off-screen aperture associated with the first virtual machine; and mapping the off-screen aperture to the off-screen buffer using a page table;

processing the graphical data based on the mapping, wherein the processing includes rendering composite graphical data representing a desktop and one or more application windows;

the one or more processors allocating physical memory space in the textual buffer associated with the second virtual machine to provide the off-screen buffer, the render buffer, and the scanout buffer; and displaying the 2D or 3D images using the processed graphical data, the processed graphical data being stored in the one or more actual buffers associated with the first virtual machine or the textual buffer associated with a second virtual machine.

8. The method of claim 7, wherein the first virtual machine is a domU type virtual machine and the second virtual machine is a domO type virtual machine having access to a display device.

9. The method of claim 7, wherein processing the graphical data in the textual buffer associated with the second virtual machine comprises:

storing the graphical data in an off-screen buffer corresponding to an off-screen aperture associated with the first virtual machine, the off-screen buffer including physical memories allocated to the first virtual machine;

transmitting the graphical data from the off-screen buffer to the render buffer in the textual buffer associated with the second virtual machine;

rendering the composite graphical data using the graphical data in the render buffer; and providing the rendered composite graphical data to the scanout buffer.

10. The method of claim 7, wherein processing the graphical data in the textual buffer associated with the second virtual machine comprises:

storing the graphical data in the off-screen buffer associated with the second virtual machine, the off-screen buffer including physical memories allocated to the second virtual machine;

transmitting the graphical data from the off-screen buffer to the render buffer in the textual buffer associated with the second virtual machine;

rendering the composite graphical data using the graphical data in the render buffer; and providing the rendered composite graphical data to the scanout buffer.

11. The method of claim 7, wherein mapping of the one or more virtual apertures or one or more actual buffers of the first virtual machine to the textual buffer of a second virtual machine is based on manipulating a page table via a graphics execution manager.

12. The method of claim 7, wherein displaying the images using the processed graphical data comprises:

transmitting the processed graphical data to a display server render buffer;

rendering the images using the processed graphical data in the display server render buffer;

providing the rendered images to a display server scanout buffer; and displaying the rendered images associated with the display server scanout buffer.

13. The method of claim 12, wherein at least one of the display server render buffer and the display server scanout buffer is a frame buffer having access to a display device.

14. A non-transitory computer readable storage medium storing instructions that, when executed by one or more processors, cause the one or more processors to perform a method for displaying images that are two dimensional (2D) or three dimensional (3D), the method comprising:

obtaining graphical data that has been generated by one or more applications associated with a first virtual machine;

mapping one or more virtual apertures or one or more actual buffers associated with the first virtual machine to a textual buffer associated with a second virtual machine, the virtual apertures being in a virtual memory space and the actual buffers being in a physical memory space, with the mapping based on the following:

providing a render buffer in the textual buffer associated with the second virtual machine corresponding to a window render aperture associated with the first virtual machine;

providing a scanout buffer in the textual buffer associated with the second virtual machine corresponding to a window scanout aperture associated with the first virtual machine;

mapping the window render aperture to the render buffer using a page table;

mapping the window scanout aperture to the scanout buffer using the page table;

providing an off-screen buffer in the textual buffer associated with the second virtual machine corresponding to an off-screen aperture associated with the first virtual machine; and mapping the off-screen aperture to the off-screen buffer using a page table;

processing the graphical data based on the mapping, wherein the processing includes rendering composite graphical data representing a desktop and one or more application windows;

the one or more processors allocating physical memory space in the textual buffer associated with the second virtual machine to provide the off-screen buffer, the render buffer, and the scanout buffer; and displaying the 2D or 3D images using the processed graphical data, the processed graphical data being stored in the one or more actual buffers associated with the first virtual machine or the textual buffer associated with a second virtual machine.

15. The computer readable storage medium of claim 14, wherein the first virtual machine is a domU type virtual machine and the second virtual machine is a dom0 type virtual machine having access to a display device.

16. The computer readable storage medium of claim 14, wherein processing the graphical data in the textual buffer associated with the second virtual machine comprises:

storing the graphical data in an off-screen buffer corresponding to an off-screen aperture associated with the first virtual machine, the off-screen buffer including physical memories allocated to the first virtual machine;

transmitting the graphical data from the off-screen buffer to the render buffer in the textual buffer associated with the second virtual machine;

rendering the composite graphical data using the graphical data in the render buffer; and providing the rendered composite graphical data to the scanout buffer.

17. The computer readable storage medium of claim 14, wherein processing the graphical data in the textual buffer associated with the second virtual machine comprises:

storing the graphical data in the off-screen buffer associated with the second virtual machine, the off-screen buffer including physical memories allocated to the second virtual machine;

transmitting the graphical data from the off-screen buffer to the render buffer in the textual buffer associated with the second virtual machine;

rendering the composite graphical data using the graphical data in the render buffer; and providing the rendered composite graphical data to the scanout buffer.

18. The computer readable storage medium of claim 14, wherein mapping of the one or more virtual apertures or one or more actual buffers of the first virtual machine to the textual buffer of a second virtual machine is based on manipulating a page table via a graphics execution manager.

19. The computer readable storage medium of claim 14, wherein displaying the images using the processed graphical data comprises:

transmitting the processed graphical data to a display server render buffer;

rendering the images using the processed graphical data in the display server render buffer providing the rendered images to a display server scanout buffer; and displaying the rendered images associated with the display server scanout buffer.

\* \* \* \* \*